United States Patent
Harris et al.

(10) Patent No.: US 7,430,431 B2
(45) Date of Patent: Sep. 30, 2008

(54) RECOVERING THE REVERSE LINK IN A CELLULAR MOBILE COMMUNICATION SYSTEM

(75) Inventors: Mark Harris, Plano, TX (US); Dimitrios Prodanos, Ottawa (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 639 days.

(21) Appl. No.: 10/881,281

(22) Filed: Jun. 30, 2004

(65) Prior Publication Data

US 2005/0124371 A1    Jun. 9, 2005

Related U.S. Application Data

(60) Provisional application No. 60/526,535, filed on Dec. 3, 2003.

(51) Int. Cl.
*H04B 7/00* (2006.01)
*H04Q 7/20* (2006.01)

(52) U.S. Cl. .................. 455/522; 455/69; 455/67.11; 455/452.2

(58) Field of Classification Search ............. 455/522, 455/69, 436, 450, 67.11, 442, 68, 13.4, 438, 455/502, 452.2, 67.13, 126, 115.1–3, 115.3, 455/517; 370/335, 318, 331, 342, 277
See application file for complete search history.

(56) References Cited

U.S. PATENT DOCUMENTS 5,982,760 A * 11/1999 Chen ..................... 370/335
6,411,817 B1 * 6/2002 Cheng et al. ............. 455/522
6,463,046 B1 * 10/2002 Faber .................... 370/335
2004/0229619 A1 * 11/2004 Adatrao et al. ........... 455/442
2005/0124371 A1 * 6/2005 Harris et al. ............. 455/522

* cited by examiner

*Primary Examiner*—John J. Lee
(74) *Attorney, Agent, or Firm*—Garlick Harrison & Markison; James A. Harrison; Kevin L. Smith (57) ABSTRACT

Operation commences with the cellular network infrastructure setting up a forward link and a reverse link with a cellular mobile station. The cellular network infrastructure transmits signals to the cellular mobile station on the forward link and receives signals from the cellular mobile station on the reverse link. The cellular network infrastructure monitors the quality of the reverse link. When the reverse link quality level meets a reverse link lost criteria, the cellular network infrastructure enters reverse link recovery mode of operation in which the transmit power of the forward link is increased in an attempt to recover the reverse link. During the reverse link recovery mode of operation, the cellular network infrastructure may determine that the reverse link quality meets a reverse link recovered criteria. When the reverse link quality meets the reverse link recovery criteria, the cellular network infrastructure exits the reverse link recovery mode of operation for the cellular mobile station and resumes normal power control operations. When the cellular network infrastructure determines that the reverse link recovery mode of operations fail, the cellular network infrastructure ceases forward link transmissions to the cellular mobile station and the call is dropped.

24 Claims, 7 Drawing Sheets

PRIOR ART

RECOVERING THE REVERSE LINK IN A CELLULAR MOBILE COMMUNICATION SYSTEM

CROSS REFERENCE TO RELATED APPLICATION

This application claims priority to U.S. Provisional Patent Application Ser. No. 60/526,535, filed Dec. 3, 2003, which is incorporated herein by reference for all purposes.

BACKGROUND

1. Field of the Invention

This invention relates generally to cellular network communications; and more particularly to the wireless link between a base station and a mobile station.

2. Background of the Invention

The general structure and operation of cellular wireless communication systems is generally known. A cellular network infrastructure typically includes a plurality of base stations that each service wireless communications for one or more cellular mobile stations within a respective cell. Typically, each base station supports a plurality of sectors within its serviced cell. Base Station Controllers (BSCs) typically service a plurality of base stations and coordinate operations within the cells serviced by the base stations. A mobile switching center (MSC) services a plurality of base station controllers and couples to the Public Switched Telephone Network (PSTN). Typically, the base station controllers or the MSC couple to the Internet to service packetized communications there through.

Cellular wireless infrastructures typically support one or more wireless protocol standards. These wireless protocol standards include Code Division Multiple Access (CDMA) protocol standards such as IS-95A, IS-95B, 1X-RTT, 1xEV-DO, 1xEV-DV, UMTS, and other CDMA type protocols. Alternately, the wireless protocol standard may service a Time Division Multiple Access (TDMA) standard such as the GSM standard, the North American TDMA standard, or other TDMA standards. The cellular mobile stations operating in the service area communicate with the base stations using such supported wireless protocol standards.

As is known, transmissions from a base station to a cellular mobile station thereof are called forward link transmissions. Likewise, transmissions from cellular mobile stations to base stations are called reverse link transmissions. The cellular network infrastructure coordinates and manages both the forward link and reverse link transmissions. Due to mobility of the cellular mobile stations, the power of forward link transmit power and reverse link transmit power are controlled. In CDMA systems, for example, reverse link transmit power and forward link transmit power must be closely controlled for each cellular mobile station. Existing CDMA wireless protocol standards provide strict guidelines for closed loop power control. With these standardized operations, a servicing base station controls reverse link transmit power by sending (as necessary) power control bits on the forward link to each serviced cellular mobile station. These power control bits are typically contained in the power control sub-channel. For each power control bit, the cellular mobile station either increases its reverse link transmit power or decreases its reverse link transmit power, depending upon the value of the power control bit.

Unfortunately, prior cellular systems were predisposed to lose the reverse link. In order to reduce interference within a service sector or cell, a prior art servicing base station directed its service cellular mobile stations to transmit at a minimum acceptable reverse link transmit power level via use of the power control bits accordingly. Thus, reverse link transmissions typically arrived with minimally sufficient power at the servicing base station. With prior systems, when the reverse link was lost, the base station (or servicing BSC) typically considered the call as lost and either kept forward link transmissions at a constant level or reduced power of the forward link transmissions. Thus, many calls were dropped due to these prior power control operations.

Problems with prior power control operations were caused by errors on the power control sub-channel, a power-up bit transmitted by the base station may be incorrectly demodulated by the mobile station as a power-down bit. These "presumed" power-down bits caused a receiving cellular mobile station to reduce its reverse link transmit power when it should have increased its reverse link transmit power. When a cellular mobile station was in soft handoff between base stations or softer handoff between sectors of the base station in a CDMA system, the cellular mobile station would receive multiple power control bits from the multiple currently serving sectors. However, the cellular mobile station was disposed to more strongly consider a power-down power control bit than power-up power control bit. Thus, the cellular mobile station in such case was predisposed to reduce its reverse link transmit power which resulted frequently in loss of the reverse link. Thus, in many prior operations, calls were dropped because of the failure to properly control reverse link transmit power of the cellular mobile station.

Thus, a need exists for improved reverse link power control operations within a cellular network.

SUMMARY OF THE INVENTION

A method for recovering a reverse link of a cellular mobile station by a cellular network infrastructure according to the present invention attempts to increase the probability of reacquisition of the reverse link by selectively controlling transmissions on the forward link. This operation commences with the cellular network infrastructure setting up a forward link and a reverse link with a cellular mobile station. The method continues with the cellular network infrastructure transmitting signals to the cellular mobile station on the forward link and receiving signals from the cellular mobile station on the reverse link. Such signals may be transmitted/received in multiple sectors from/to one or more base stations in a Code Division Multiple Access (CDMA) system during soft/softer handoff.

In receiving the reverse link from the cellular mobile station, the cellular network infrastructure monitors the quality of the reverse link. A base station and/or a base station controller of the cellular network infrastructure may perform such monitoring. When the reverse link quality level meets a reverse link lost criteria, the cellular network infrastructure enters reverse link recovery mode of operation in which the transmit power of the forward link is increased in an attempt to recover the reverse link. During the reverse link recovery mode of operation, the cellular network infrastructure may determine that the reverse link quality meets a reverse link recovered criteria. When the reverse link quality meets the reverse link recovery criteria, the cellular network infrastructure exits the reverse link recovery mode of operation for the cellular mobile station and resumes normal power control operations. However, when the cellular network infrastructure determines that the reverse link recovery mode of operations fail, the cellular network infrastructure ceases forward link transmissions to the cellular mobile station and the call is dropped.

According to some aspects of the present invention, at least one of the reverse link lost criteria and the reverse link recovery criteria are selectable. The reverse link lost criteria and/or the reverse link recovery criteria may include components representative of an energy-to-noise ratio (Eb/No), an energy-to-interference ratio (Ec/Io), and/or a frame erasure rate level. Further, at least one of the reverse link lost criteria and the reverse link recovery criteria may include a selectable reverse link quality threshold and a selectable duration.

In the reverse link recovery mode of operation, forward link transmit power is typically varied over time. According to one embodiment, the forward link transmit power may be maintained at a maximum value for a selectable period and then reduced to a minimum level for a selectable period. The forward link transmit power may be varied between the maximum value and the minimum value for a selectable number of cycles in an attempt to recover the reverse link. In the CDMA standard, to facilitate a recovery of the reverse link, the BTS reverse link Traffic Channel Demodulation Search Width may be varied in a selectable manner during the reverse link recovery mode of operation.

According to some embodiments of the present invention, the reverse link recovery mode of operation includes first maintaining the forward link transmit power at a selected value for a selectable period. After the selectable period has expired, the mode includes increasing forward link transmit power at a selectable rate until the forward link transmit power has reached a maximum value. The forward link transmit power is then maintained at the maximum value for a selectable period. Then, the forward link transmit power is decreased from the maximum value to a minimum value at a selectable rate. The forward link transmit power is then maintained at the minimum value for a selectable period. The operations of increasing, maintaining, decreasing, and maintaining the forward link transmit power may be repeated for a selectable number of cycles until the reverse link is either recovered or the reverse link recovery mode of operation has completed without recovery of the reverse link. In one example of a failure to recover the reverse link, the failure occurs when the reverse link quality has failed to rise above a selectable threshold for a selectable period. Further, the reverse link is deemed to have been recovered in some embodiments when the reverse link quality has risen above a selectable threshold for a selectable period.

In another embodiment, the reverse link recovery mode of operation is enacted during call setup to improve call setup itself. When the call has been successfully setup (and the reverse link has been recovered) the reverse link recovery mode of operation is exited. Further, note that an inherent benefit of successful reverse link recovery according to the present invention results in recovery of the forward link by the serviced cellular mobile station. While the servicing base station cannot determine when the serviced cellular mobile station has lost the forward link (or a portion of the forward link relating to reverse link power control), the servicing base station may assume that the serviced cellular mobile station has recovered the forward link when the reverse link is reacquired by the servicing base station.

Other features and advantages of the present invention will become apparent from the following detailed description of the invention made with reference to the accompanying drawings.

BRIEF DESCRIPTION OF THE DRAWINGS

A better understanding of the present invention may be obtained when the following detailed description of the preferred embodiment is considered in conjunction with the following drawings, in which.

DETAILED DESCRIPTION OF THE DRAWINGS

Figure 1:
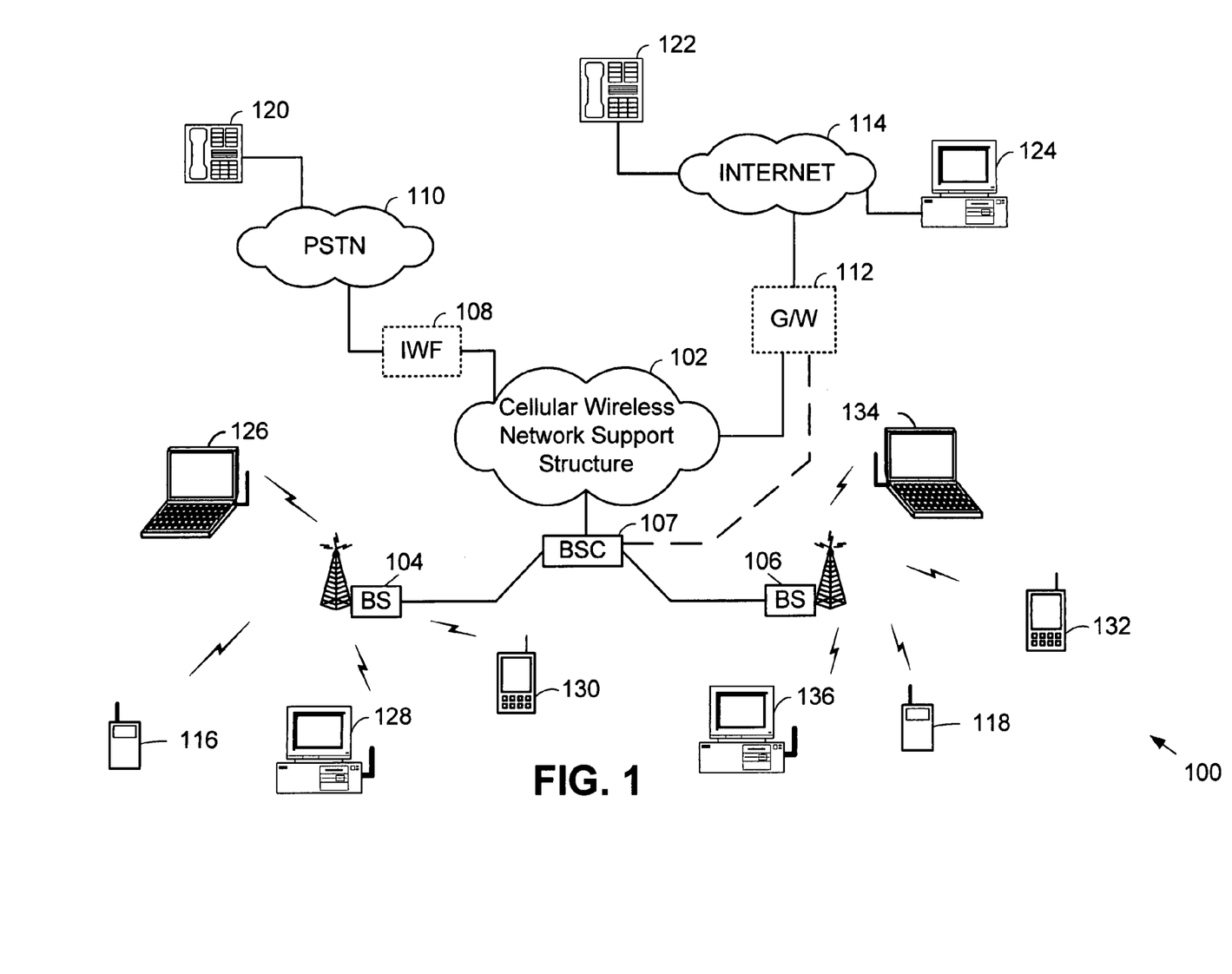
FIG. 1 is a system diagram illustrating a portion of a cellular wireless network infrastructure constructed and operating according to the present invention.

FIG. 1 is a system diagram illustrating a portion of a cellular wireless network infrastructure constructed and operating according to the present invention. The cellular wireless network infrastructure 100 includes a cellular wireless network support structure 102, base station controller (BSC) 107, base station 104, and base station 106. The cellular wireless network 100 operates according to one or more protocol standards, e.g., IS-95A, IS-95B, 1xRTT, 1xEV-DO, 1xEV-DV, GSM, UMTS, TDMA, AMPS, ANSI-41, etc. Note that the operations of the present invention may require modification of some aspects of its supported protocol standard(s).

The cellular wireless network support structure 102 couples to the Internet 114. The cellular wireless network support structure 102 also couples to the Public Switched Telephone Network (PSTN) 110. In one embodiment of the present invention, the cellular wireless network support structure 102 is circuit switched, couples directly to the PSTN 110 (without an Inter Working Function "IWF"), and couples to the Internet 114 via a gateway (G/W) 112. In another embodiment of the present invention, the cellular wireless network support structure 102 is packet switched, couples directly to the Internet 114 (without the G/W 112), and couples to the PSTN via the IWF 108.

Cellular mobile stations 116, 118, 126, 128, 130, 132, 134, and 136 wirelessly couple to the cellular wireless network infrastructure 100 via wireless links with the base stations 104 and 106. As illustrated, cellular mobile stations may include cellular telephones 116 and 118, laptop computers 126 and 134, desktop computers 128 and 136, and data terminals 130 and 132. However, the wireless network supports communications with other types of cellular mobile stations as well, such as hybrid PDA/phone/camera terminals and other types of mobile stations.

Each of the base stations 104 and 106 services a cell/set of sectors within which it supports wireless communications. Wireless links with the cellular mobile stations include the forward link (transmissions from a serving base station to a serviced cellular mobile station) and the reverse link (transmissions from the serviced cellular mobile station to the serving base station). The forward and reverse links support one or both of voice communications and data communications. The teachings of the present invention apply equally to any type of cellular wireless communication.

The base stations 104 and 106 and/or the BSC 107 support reverse link recovery operations according to the present invention. As will be further described with reference to FIGS. 2-7, with such reverse link recovery operations, the cellular network infrastructure 100 transmits signals to a cellular mobile station on a forward link, receives signals from the cellular mobile station on a reverse link, and monitors the quality of the reverse link. When the reverse link quality meets a reverse link lost criteria, the cellular network infrastructure 100 enters a reverse link recovery mode of operation in which the transmit power of the forward link is increased in an attempt to recover the reverse link. These operations maybe performed by one or more servicing base stations 104 and 106 and/or the BSC 107. When the cellular network infrastructure 100 determines that the reverse link recovery mode of operation has succeeded by the reverse link quality meeting a reverse link recovered criteria, the cellular network infrastructure 100 exits the reverse link recovery mode of operation. Further, when the cellular network infrastructure 100 determines that the reverse link recovery mode of operation has failed the cellular network infrastructure 100 ceases forward link transmissions to the cellular mobile station.

Figure 2:
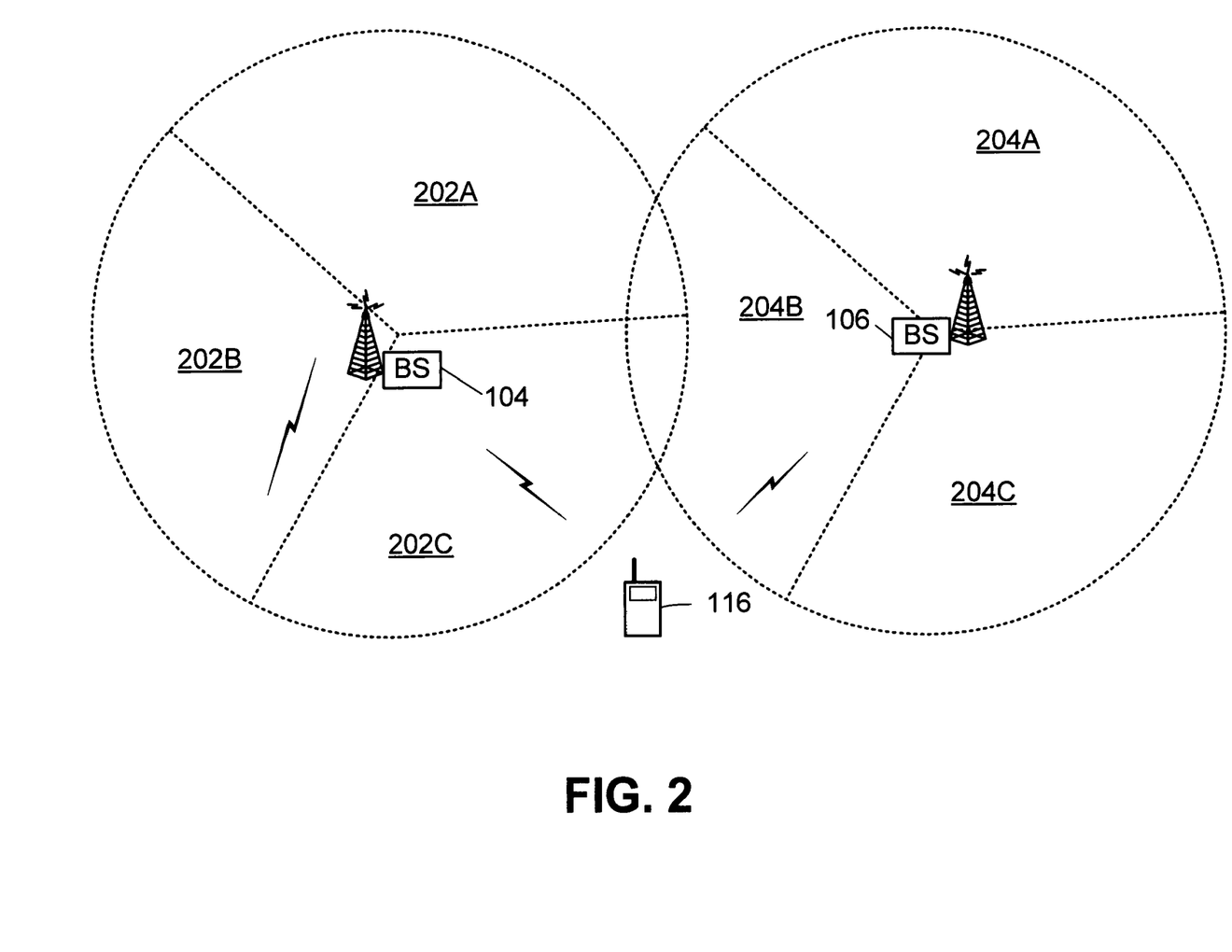
FIG. 2 is a partial system diagram illustrating a portion of the system of FIG. 1.

FIG. 2 is a partial system diagram illustrating a portion of the system of FIG. 1. As is shown in FIG. 2, base stations 104 and 106 service wireless communications for cellular mobile station 116. Base station 104 services communications within sectors 202A, 202B, and 202C. Likewise, base station 106 services communications within sectors 204A, 204B, and 204C. During soft handoff, cellular mobile station 116 receives forward link transmissions from both base station 104 and 106 and typically occurs when the cellular mobile station 116 is moving from one cell to another. During softer handoff, cellular mobile station 116 receives forward link transmissions in multiple sectors of a common base station, e.g., sectors 202B and 202C serviced by base station 104. According to one aspect to the present invention, as will be further described with reference to FIG. 4, forward link transmissions in multiple sectors may be managed in unison with the reverse link recovery mode of operation of the present invention.

Figure 3:
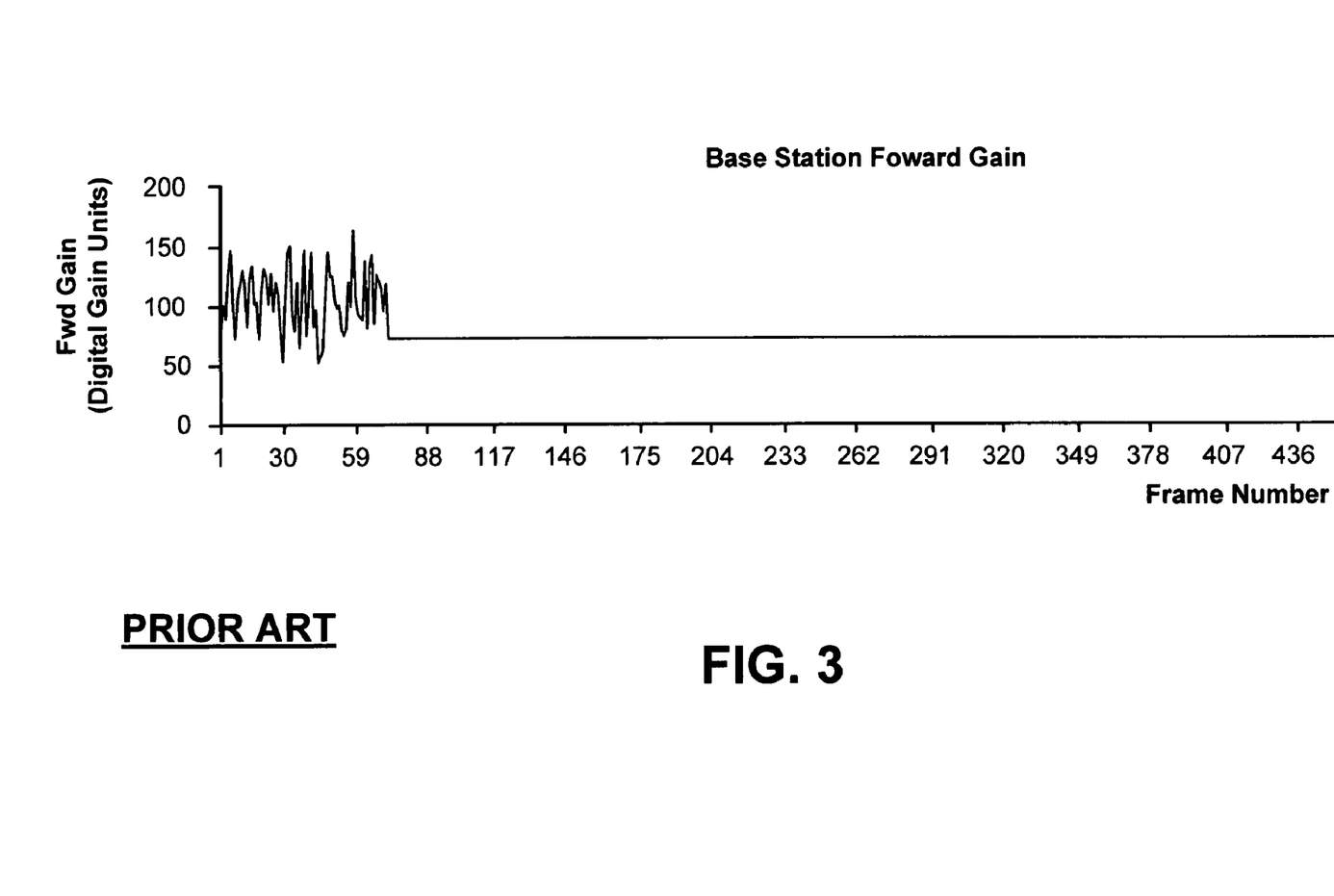
FIG. 3 is a graph illustrating a prior art forward link transmit profile upon loss of a reverse link.

FIG. 3 is a graph illustrating a prior art forward link transmit profile upon loss of a reverse link. As shown, for frame numbers 1 through approximately 70, the forward link BTS gain varies over time based upon reported signal strengths by the serviced cellular mobile station. As is generally known, in conventional reverse link closed loop power control operations, the cellular mobile station reports the received strength of forward link signals. Likewise, the cellular network infrastructure measures the strength of received reverse link signals from the cellular mobile station. Based upon these measured strengths, the cellular network infrastructure (BTS of base station and/or BSC) adjusts the forward link transmit power and also produces power control bits and transmits these power control bits to the cellular mobile station. Thus, referring frame number 1 to approximately frame number 70, the base station adjusts its forward link gain for a particular cellular mobile station using this methodology.

When the reverse link is lost, as indicated at approximately frame number 70, the base station no longer has information upon which to base its forward link transmit power. Thus, at this time, the base station holds its forward link transmit power at a fixed gain. As was previously described, by holding the forward link transmit power at the fixed gain, sufficient probability exists that the reverse link will be permanently lost and the call will be dropped. Such is the case in the example of FIG. 3. In other prior art embodiments, when the reverse link was lost, the forward gain was gradually reduced towards zero with time under the assumption that the reverse link would not be recovered and the call would be dropped anyway. While reducing the forward link gain reduces interference for other serviced cellular mobile stations, it does nothing to recover the lost reverse link.

Figure 4:
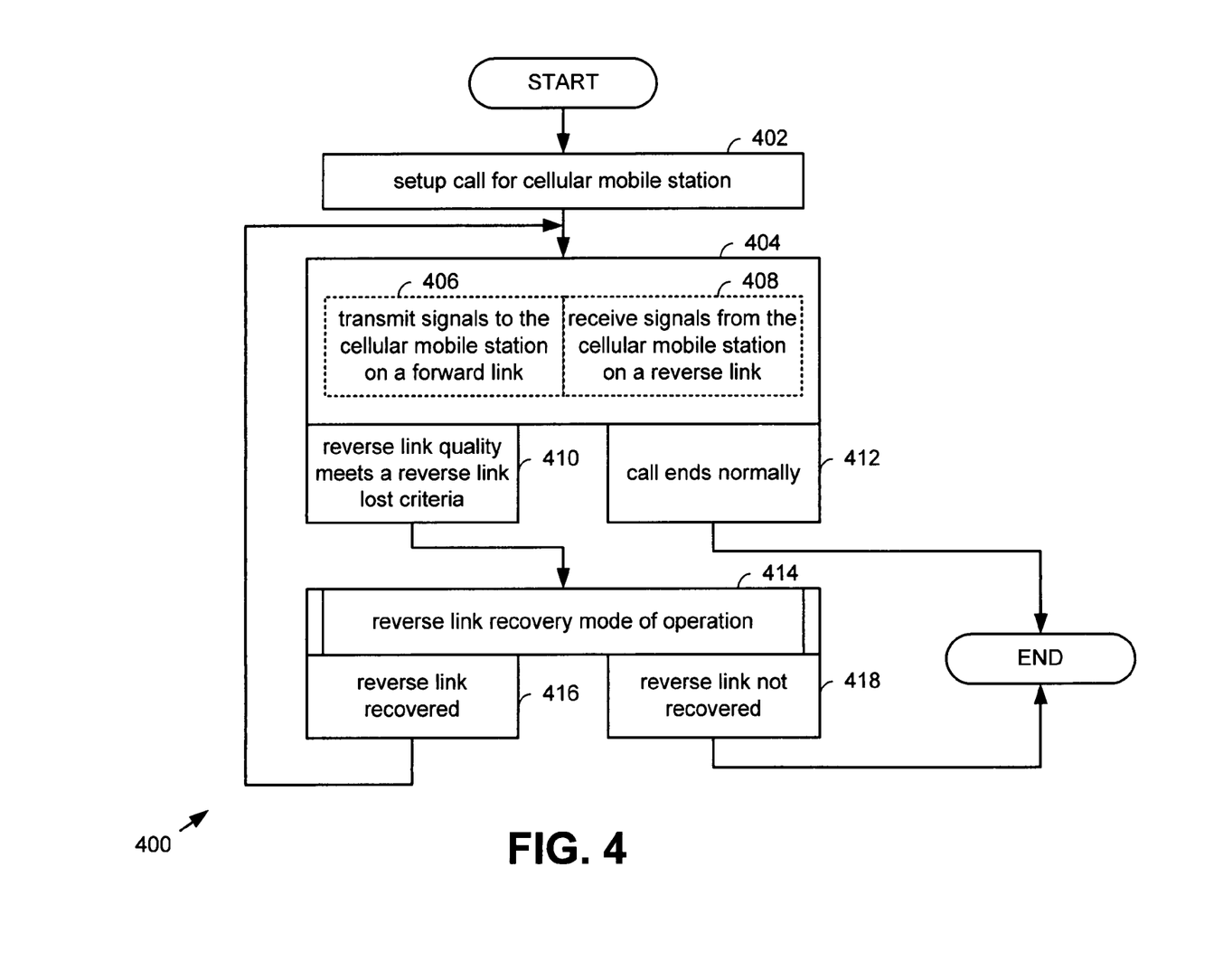
FIG. 4 is a flow chart illustrating an operation according to the present invention in recovering a reverse link of a cellular mobile station by a cellular network infrastructure.

FIG. 4 is a flow chart illustrating an operation according to the present invention in recovering a reverse link of a cellular mobile station by a cellular network infrastructure. Operation 400 of FIG. 4 commences in setting up a call for the cellular mobile station (step 402). During call setup at step 402, the cellular network infrastructure sets up at least one forward link traffic channel and at least one reverse link traffic channel the cellular mobile station. With the call setup, operation proceeds to block 404 (that includes step 406 and step 408). For the duration of the call, the cellular network infrastructure transmits signals to the cellular mobile station on the forward link (step 406) and receives signals from the cellular mobile station on the reverse link (step 408). The operation of step 404 (including steps 406 and 408) continues until one of two things occurs: normal call termination (step 412) or assumed unrecoverable loss of the reverse link (step 410). A first operation occurs when the call ends normally (step 412).

According to the present invention, when reverse link quality meets a reverse link lost criteria (step 410), a reverse link recovery mode of operation according to the present invention is initiated (step 414). The details of one embodiment of the operation at step 414 are described more fully with reference to FIG. 5. The reverse link recovery mode of operation at step 414 ends in one of two manners. In a first manner, the reverse link is recovered (step 416) and operation proceeds again to step 404. A second possible outcome of the reverse link recovery mode of operation of step 414 results in the reverse link not being recovered (step 418). When the reverse link is not recovered at step 418, the forward link transmissions to the cellular mobile station are terminated and the call is dropped.

According to some aspects of the present invention, at least one of the reverse link lost criteria and the reverse link recovery criteria are selectable. The reverse link lost criteria and/or the reverse link recovery criteria may include components representative of an energy-to-noise ratio (Eb/No), an energy-to-interference ratio (Ec/Io), and/or a frame erasure rate level. Further, at least one of the reverse link lost criteria and the reverse link recovery criteria may include a selectable reverse link quality threshold and also a selectable duration.

In the reverse link recovery mode of operation, forward link transmit power is typically varied over time. According to one embodiment, the forward link transmit power may be maintained at a maximum value for a selectable period and then reduced to a minimum level for a selectable period. The forward link transmit power may be varied between the maximum value and the minimum value for a selectable number of cycles in an attempt to recover the reverse link. In one example of a failure to recover the reverse link, the failure occurs when the reverse link quality has failed to rise above a selectable threshold for a selectable period. Further, the reverse link is deemed to have been recovered in some embodiments when the reverse link quality has risen above a selectable threshold for a selectable period.

According to one aspect of the present invention, when the reverse link recovery mode of operation is activated, all active transmitting sectors of the cellular and network infrastructure enter the reverse link recovery mode in unison. Referring again to FIG. 2, during soft/softer handoff, base station 104 transmits on the forward link to cellular mobile station 116 in sectors 202B and 202C while base station 106 transmits on the forward link to cellular mobile station 116 in sector 204B. The forward link transmissions in each of sectors 202B, 202C, and 204A operate in unison according to the reverse link recovery mode of the present invention. However, the forward link transmit powers may vary in these sectors 202B, 202C, and 204B depending upon various system conditions. Because the cellular mobile station 116 is responsive to power control bits from each transmitting sector 202B, 202C, and 204B, the cellular mobile station 116 is more likely to correctly adjust its reverse link transmit power with the increase in power of the forward link in all servicing sectors 202B, 202C, and 204A.

Figure 5:
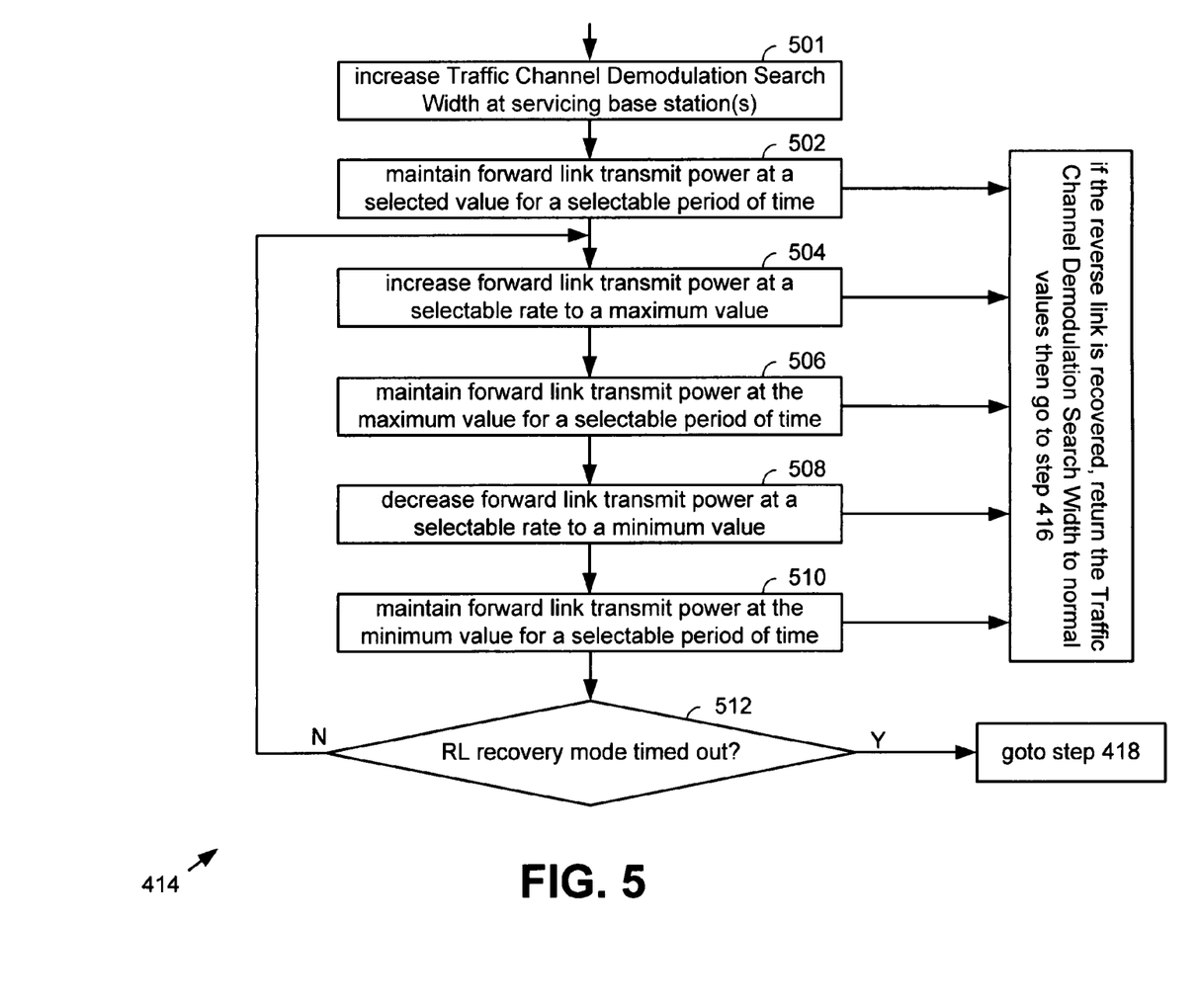
FIG. 5 is a flow chart illustrating one embodiment of the reverse link recovery mode of operation of the present invention.

FIG. 5 is a flow chart illustrating one embodiment of the reverse link recovery mode of operation of the present invention. The operation at step 414 commences with one or more servicing base station(s) increasing the Traffic Channel Demodulation Search Width (step 501). A cause for the BTS of a serving base station failing to demodulate a powerful reverse link transmission occurs when the BTS is looking in the wrong time space for the reverse link signal. When this occurs, the BTS presumes that the reverse link is lost. In CDMA systems, the failure condition exists because the traffic channel demodulation search window is centered at the wrong time offset and the mobile station's reverse link energy falls outside the search window. To overcome this failure, the BTS must be given the opportunity to search a wider time space (i.e., "search width") in an attempt to receive the reverse link transmissions.

When the mobile station is in handoff, such that multiple handoff sectors are servicing the mobile station, all handoff sectors will be adjusted according to a configurable profile (defined in a similar manor to the power probing profile described further below). In a simplest embodiment, the specific profile of the search width can simply be that of a single step, i.e., the Traffic Channel Demodulation Search Width is a configurable factor greater than the Traffic Channel Demodulation Search Width prior to the presumed loss of the reverse link Operation of step 414 continues in maintaining a forward link transmit power at a selected value for a selectable period (step 502). From any of steps 504-510, if the reverse link is recovered, operation proceeds to step 416 of FIG. 4. From step 502 if the reverse link is not recovered, operation continues with increasing the forward link transmit power at a selectable rate to a maximum value (step 504). Then, operation includes maintaining the forward link transmit power at the maximum value for a selectable period (step 506). Then, the forward link transmit power is decreased at a selectable rate to a minimum value (step 508). The forward link transmit power is then maintained at the minimum value for a selectable period (step 510). The operations of step 504-510 include one probing period or probe cycle of the reverse link recovery mode of operation. After step 510 is completed without recovering the reverse link, it is determined whether the reverse link recovery mode has timed out (step 512). If the reverse link recovery mode is not timed out, operation proceeds from step 512 to step 504 where another probing cycle is commenced. However, if the reverse link recovery mode has timed out (step 512), operation proceeds to step 418 of FIG. 4.

Figure 6A:
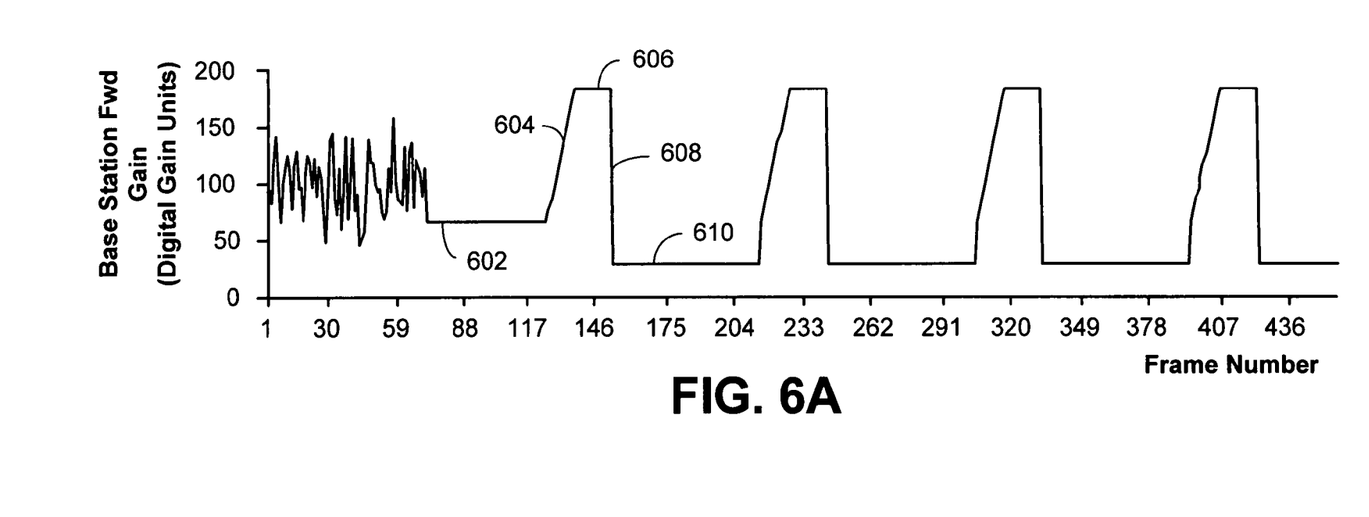
FIGS. 6A, 6B, and 7 are graphs illustrating particular forward link transmit power probe characteristics according to the present invention.
Figure 6B:
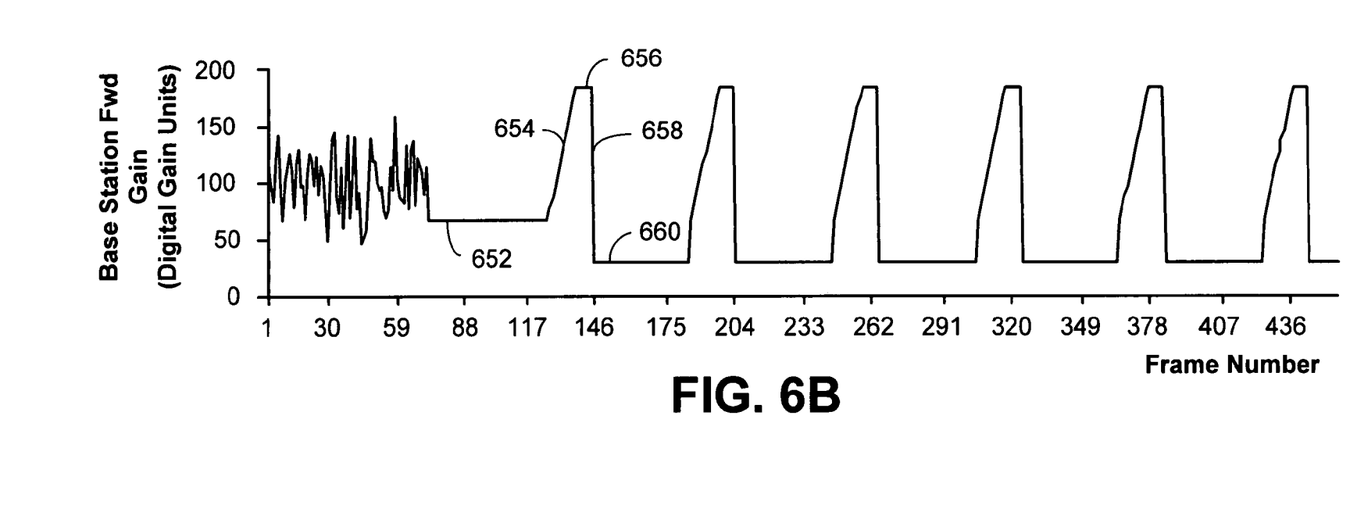
Figure 7:
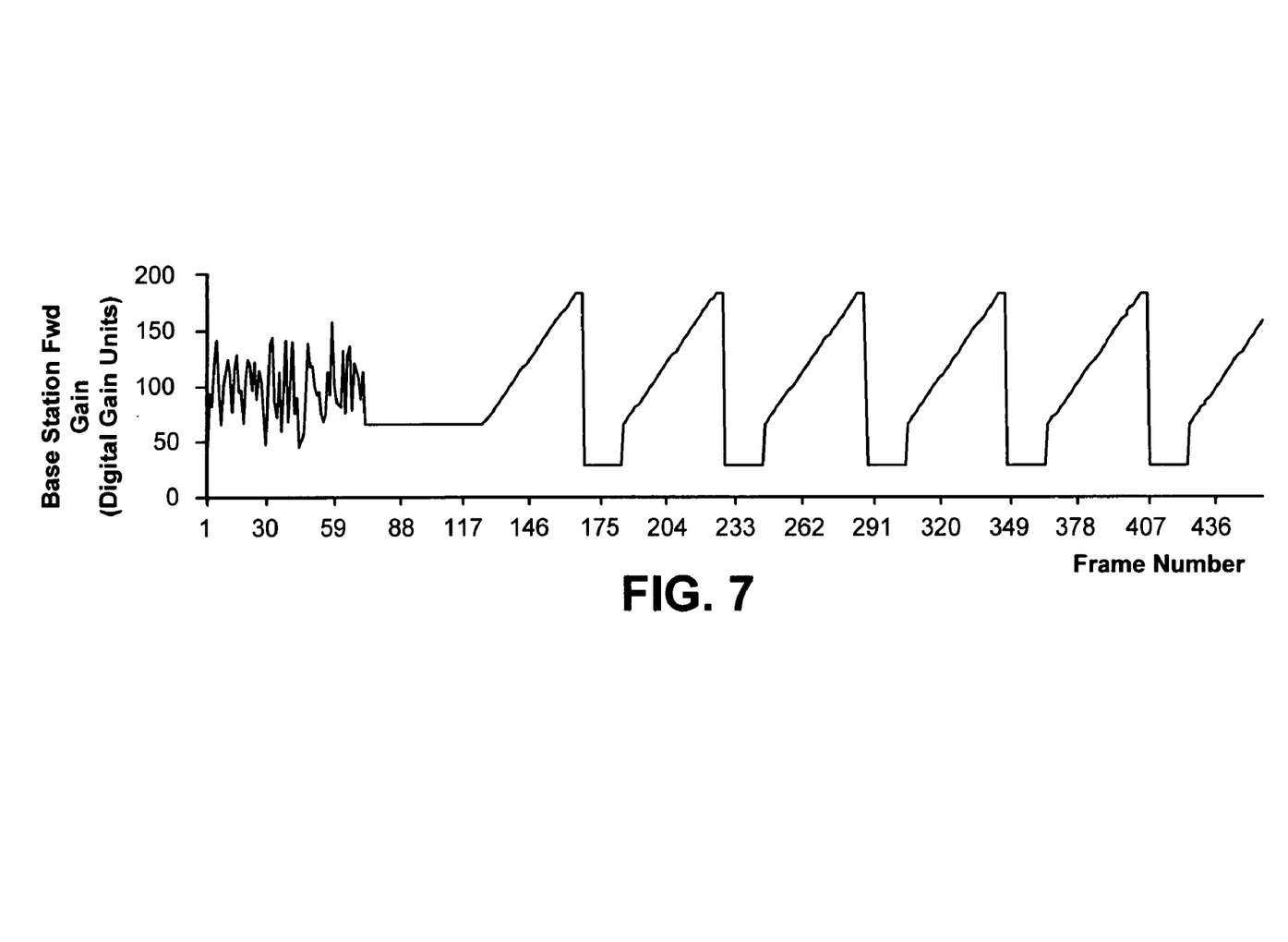

FIGS. 6A, 6B, and 7 are graphs illustrating particular forward link transmit power probe characteristics according to the present invention. The examples of these figures are based on a CDMA implementation. The probing profiles of the FIGS. 6A-7 are formed consistently with the operations of FIG. 5 and are based upon the following parameters:

TxMaxGain—The maximum gain available to the reverse link recovery algorithm.

TxMinGain—The minimum gain available to the reverse link recovery algorithm.

MobileRecoveryStartupDelay—Upon losing the reverse link, this is the wait period (in frames) required before the Reverse Link Recovery Algorithm will activate, i.e. the reverse link is considered lost after MobileRecoveryStartupDelay consecutive frames.

MobileRecoveryPeriod—During the CallDropTimer period the forward link is probed at high power. The number of probes possible in the CallDropTimer period will depend on the MobileRecoveryPeriod (measured in frames). For example if the CallDropTimer is 9 seconds (450 frames) and MobileRecoveryPeriod is 90 frames then 5 forward link probes will be attempted before a call is finally dropped.

FwdProbeDutyCycle—During the Fwd link probing period it is probably not a good idea to transmit at high power constantly. High power should only be used for a fraction of the MobileRecoveryPeriod in order to minimize the impact to forward link RF capacity. FwdProbeDutyCycle is a percentage value representing the probe burst width relative to the MobileRecoveryPeriod. When the forward link is not engaged in a probe power burst then the forward link gain is reduced to TxMinGain.

FwdProbeStepSize—The forward gain should not be ramped up to TxMaxGain in one step at the start of the probe. If the probe ramps up slowly perhaps the mobiles reverse link can be recovered prior to reaching maximum power. A reduction in Fwd link RF capacity degradation will result. The FwdProbeStepSize is described in units of Digital Gain Units (DGUs) for convenience only.

MobileRecoveryStartupDelay_StartOfCallOffset—The Reverse Link Recovery Algorithm may be invoked at the start of the call. The Reverse Link Recovery Algorithm will start the call as normal but will increase the forward gain according to the configured probing profile once the reverse link fails to be captured by any of the BTSs involved after MobileRecoveryStartupDelay_StartOfCallOffset frames.

Referring now to FIG. 6A, a first particular probing operation is illustrated. With this probing profile, various selectable parameters are set. In particular, the mobile recovery startup delay is set to 50 frames, the mobile recovery period is set to 90 frames, the forward probe duty cycle is set to 30%, and the forward probe step size is set to 10. Further, with the operations of FIG. 6A, the transmit minimum gain is 35 DGUs, and the transmit maximum gain is 190 DGUs.

As shown in FIG. 6A, after the reverse link is lost, the forward link transmit power is maintained at a selected value for a selectable period shown at 602 for the selectable period. The forward link transmit power is then increased at a selectable rate at 604 until it reaches a maximum value at 606. The forward link transmit power is maintained for a selectable period at 606 and then it is decreased at a selectable rate during period 608 until it reaches a minimum value 610. The forward link transmit power is then held at the minimum value for the selectable period as indicated at 610.

In the example of FIG. 6B, the mobile recovery startup delay is 50 frames, the mobile recovery period is 60 frames, the forward probe duty cycle is 30%, the forward probe step size is 10 DGUs, the TX min gain is 35 DGUs, and the TX max gain is 190 DGUs. As is shown, in FIG. 6B, the forward link transmit power is maintained at the selectable value for a selectable period as indicated at 652. The forward link transmit power is then increased at a selectable rate to a maximum value as indicated in segment 654. The forward link transmit power is then maintained at the maximum value for a selectable period as indicated as 656. The forward link transmit power is then decreased at a selectable rate to a minimum value as indicated at 658. The forward link transmit power is then maintained at the minimum value for the selectable period as indicated at 660. This probe cycle continues until the reverse link recovery mode of operation ceases.

FIG. 7 illustrates still other probe pattern or shape. In particular, for FIG. 7, the normal recovery startup delay is 50 frames, the mobile recovery period is 60 frames, and the forward probe duty cycle is 70%. The forward probe step size is 3 DGUs, the TX min gain is 35 DGUs, and the TX max gain is 190 DGUs.

Referring generally to all of the FIGS., the following observations are made. Once the reverse link recovery mode of operation commences for a given mobile terminal, conventional forward link power control is overridden and replaced with forward link power control behavior for that mobile terminal according to the present invention as exhibited in FIGS. 6A-7 and as described in FIGS. 4-5. The forward link transmit power probe profile continues with respect to the given mobile terminal until either the reverse link is recovered or the reverse link recovery mode of operation ceases. A maximum recovery rate of the reverse link is possible if the power delivered on the forward traffic channel and/or the forward power control sub-channel is increased to a maximum available power. Such increase in forward link transmit power of the traffic channel and the power control sub-channel will result in minimum bit error rate transmissions on these channels and will cause the cellular mobile station to respond appropriately with its reverse link transmit power. Although this maximum power will yield the greatest chance for recovering a lost reverse link, the penalty for such operation is paid in the form of forward link capacity degradation. Such forward link capacity degradation for other service cellular mobile stations may be unacceptable in many operating scenarios. Thus, the probing profiles of FIGS. 6A-7 and similar probing profiles will typically provide significant benefit in causing recovery of lost reverse links without unduly interfering with other forward link transmissions.

In one particular implementation of the present invention in implementing the reverse link recovery mode and executing the probing profile, the following operation is performed:

Control parameters are all 8 bit unsigned numbers (0-255), packed into a single recoveryParameter (0xJJKKLLMM), configurable through normal network configuration parameters. The default is 0x0, which deactivates the algorithm.

upStep (JJ)=per frame power increase during upTime (¼ dB units)

upTime (KK)=number of frames to raise power during each cycle.

downTime (LL)=number of frames to hold transmit gain at minimum value during each cycle.

waitTime (MM)=number of zero fwd gain frames (erasures) to wait before starting first cycle Note that even while this algorithm is operating, normal fast forward power control and power control sync (if activated) is in operation. This ensures that forward link power control resumes as quickly as possible if the cellular mobile station reverse link is reacquired, since the algorithm itself will be a little slow to stop because of the roundtrip delay between the BTSs and the BSC.

According to this operation:

1. The basic idea is to check the reverse link erasure indicator arriving from the BSC every frame. If a reverse link erasure is indicated, increment a counter, if not, reset the counter to zero.
2. When the counter exceeds the wait time, start the reverse link mode.
3. For upTime frames, boost the current forward gain every frame by the upStep amount (these two parameters allow you to control the duration and slope of the boost).
4. Then, for the first downTime frame, reduce the forward gain to the minimum (a ramp is not implemented here). Apply no gain changes for the remaining downTime frames. If downTime is zero, the gain will never be reduced.
5. Once the last downTime frame is processed, the algorithm goes back to upTime frames.
6. Continue until the call drops or stop when the first non erasure is indicated by the BSC (go back to 1 in this case).

These operations may be implemented on software execute by a servicing base station or by the BSC. One particular embodiment of this software is as follows:

```
// Whispering BTS Recovery
// Override forward gain if necessary for recovery algorithm
if ( RecoveryParameter && CallControlDB.TrafficChannelType == CSMTRCC_FCH )
{
  byte upStep        = (RecoveryParameter >> 24) & 0xFF;
  byte upTimeFrames  = (RecoveryParameter >> 16) & 0xFF;
  byte downTimeFrames = (RecoveryParameter >> 8 ) & 0xFF;
  byte waitTimeFrames = (RecoveryParameter      ) & 0xFF;
        // a zero fwd gain from BSC indicates erasure so start counting
  if ( ! FrameBuffer[SbsFrameIndex].FwdGain )
  {
    RecoveryWaitCounter++;
  }
  // else non erasure, so reset our counters and wait for a bad frame
  else
  {
    RecoveryWaitCounter = 0;
    RecoveryProbeCounter = 0;
  }
        if ( RecoveryWaitCounter >= waitTimeFrames ) // trigger the recovery probe
  {
    // first, ensure there are upTime frames with increasing power
    if ( RecoveryProbeCounter < upTimeFrames )
```

```
    {
        SyncFPC.LatestCorrection = upStep;
    }
    // then, ramp down power on the first downTime frame only
    else if ( (RecoveryProbeCounter == upTimeFrames) && downTimeFrames )
    {
        SyncFPC.LatestCorrection = -255;
    }
    else
    {
        // for remaining downTime frames, do nothing
    }
            // increment our spot in the recovery probe cycle and reset when done
    if ( ++RecoveryProbeCounter >= (word32) (upTimeFrames + downTimeFrames) )
    {
        RecoveryProbeCounter = 0;
                // Increment number of times the recovery has been applied
        // Update here since this get executed once per probe
        NumRecoveryProbes++;
    }
    }
}
} // End of Whispering BTS recovery
```

As one of average skill in the art will appreciate, the term "substantially" or "approximately," as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled." As one of average skill in the art will further appreciate, the term "compares favorably," as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The invention disclosed herein is susceptible to various modifications and alternative forms. Specific embodiments therefore have been shown by way of example in the drawings and detailed description. It should be understood, however, that the drawings and description thereto are not intended to limit the invention to the particular form disclosed, but on the contrary, the invention is to cover all modifications, equivalents and alternatives falling within the spirit and scope of the present invention as defined by the claims.

The invention claimed is:

1. A method for recovering a reverse link of a cellular mobile station by a cellular network infrastructure, the method comprising:

transmitting signals to the cellular mobile station on a forward link;

receiving signals from the cellular mobile station on a reverse link;

monitoring a reverse link quality of the reverse link;

when the reverse link quality meets a reverse link lost criteria, entering a reverse link recovery mode of operation in which the transmit power of the forward link is increased in an attempt to recover the reverse link, wherein the reverse link recovery mode of operation further includes:

maintaining forward link transmit power at a maximum value for a first selectable period; and reducing the forward link transmit power to a minimum level for a second selectable period;

when determining that the reverse link recovery mode of operation has succeeded by the reverse link quality meeting a reverse link recovered criteria, exiting the reverse link recovery mode of operation; and when determining that the reverse link recovery mode of operation has failed, ceasing forward link transmissions to the cellular mobile station.

2. The method of claim 1, wherein at least one of the reverse link lost criteria and the reverse link recovered criteria are selectable.

3. The method of claim 1, wherein at least one of the reverse link lost criteria and the reverse link recovered criteria include components representative of at least one of an Eb/No, and Ec/Io, and a frame erasure rate level.

4. The method of claim 1, wherein at least one of the reverse link lost criteria and the reverse link recovered criteria comprises:

a selectable reverse link quality threshold; and a selectable duration.

5. The method of claim 1, wherein the forward link transmit power is increased at a selectable rate.

6. The method of claim 1, wherein all transmitting sectors serviced by the cellular network infrastructure enter the reverse link recovery mode substantially in unison.

7. The method of claim 6, wherein forward link transmit power varies substantially in unison across all transmitting sectors serviced by the cellular network infrastructure.

8. The method of claim 1, wherein at least one of a base station of the cellular network infrastructure and a base station controller of the cellular network infrastructure initiate and perform the reverse link recovery mode of operation.

9. The method of claim 1, wherein the reverse link recovery mode of operation includes increasing the Traffic Channel Demodulation Search Width.

10. A cellular network infrastructure that recovers a reverse link of a cellular mobile station, the cellular network infrastructure comprising:
   a base station that is operable to transmit signals to the cellular mobile station on a forward link and to receive signals from the cellular mobile station on a reverse link; and
   at least one element of the cellular network infrastructure operable to:
      monitor a reverse link quality of the reverse link;
      when determining that the reverse link quality meets a reverse link lost criteria, implement a reverse link recovery mode of operation in which transmit power of the forward link is increased in an attempt to recover the reverse link, wherein in the reverse link recovery mode of operation the base station is further operable to:
         maintain forward link transmit power at a maximum value for a first selectable period; and
      reduce the forward link transmit power to a minimum level for a second selectable period;
      when determining that the reverse link recovery mode of operation has succeeded by the reverse link quality meeting a reverse link recovered criteria, exit the reverse link recovery mode of operation; and
      when determining that the reverse link recovery mode of operation has failed, direct the base station to cease forward link transmissions to the cellular mobile station.

11. The cellular network infrastructure of claim 10, wherein at least one of the reverse link lost criteria and the reverse link recovered criteria are selectable.

12. The cellular network infrastructure of claim 10, wherein at least one of the reverse link lost criteria and the reverse link recovered criteria include components representative of an Eb/No, and Ec/Io, and a frame erasure rate level.

13. The cellular network infrastructure of claim 10, wherein at least one of the reverse link lost criteria and the reverse link recovered criteria comprises:
   a selectable reverse link quality threshold; and
   a selectable duration.

14. The cellular network infrastructure of claim 10, wherein the base station is operable to increase the forward link transmit power at a selectable rate.

15. The cellular network infrastructure of claim 10, wherein all transmitting sectors serviced by the cellular network infrastructure are operable to enter the reverse link recovery mode substantially in unison.

16. The cellular network infrastructure of claim 15, wherein forward link transmit power for the cellular mobile station varies substantially in unison in all transmitting sectors.

17. The cellular network infrastructure of claim 10, wherein the at least one element of the cellular network infrastructure comprises:
   the base station;
   a base station controller; or
   a combination of the base station and the base station controller.

18. The cellular network infrastructure of claim 10, wherein int he reverse link recovery mode of operation the base station is operable to increase the Traffic Channel Demodulation Search Width.

19. A method for recovering a reverse link of a cellular mobile station by a cellular network infrastructure, the method comprising:
   transmitting signals to the cellular mobile station on a forward link;
   receiving signals from the cellular mobile station on a reverse link;
   monitoring the a reverse link quality of the reverse link;
   when the reverse link quality meets a reverse link lost criteria, entering a reverse link recovery mode of operation to attempt to recover the reverse link, wherein the reverse link recovery mode of operation includes:
      (a) maintaining forward link transmit power at a selected value for a first selectable period;
      (b) increasing forward link transmit power at a first selectable rate to a maximum value;
      (c) maintaining forward link transmit power at the maximum value for a second selectable period;
      (d) decreasing forward link transmit power at a second selectable rate to a minimum value;
      (e) maintaining forward link transmit power at the minimum value for a third selectable period; and
      (f) repeating operations (b) through (e) for a selectable number of cycles or until a desired reverse link is recovered, whichever occurs first;
   when determining that the reverse link recovery mode of operation has succeeded by the reverse link quality meeting a reverse link recovered criteria, exiting the reverse link recovery mode of operation; and
   when determining that the reverse link recovery mode of operation has failed, ceasing forward link transmissions to the cellular mobile station.

20. The method of claim 19, wherein at least one of the reverse link lost criteria and the reverse link recovered criteria are selectable.

21. The method of claim 19, wherein the reverse link lost criteria and the reverse link recovered criteria include a component representative of at least one of an Eb/No, an Ec/Jo, and a frame erasure rate level.

22. A cellular network infrastructure that recovers a reverse link of a cellular mobile station, the cellular network infrastructure comprising:
   a base station that is operable to transmit signals to the cellular mobile station on a forward link and to receive signals from the cellular mobile station on a reverse link; and
   at least one element of the cellular network infrastructure operable to:
      monitor a reverse link quality of the reverse link;
      when determining that the reverse link quality meets a reverse link lost criteria, implement a reverse link recovery mode of operation in which the base station is operable to:
         (a) maintain forward link transmit power at a first selected value for a first selectable period;
         (b) increase forward link transmit power at a first selectable rate to a maximum value;
         (c) maintain forward link transmit power at the maximum value for a second selectable period;
         (d) decrease forward link transmit power at a second selectable rate to a minimum value;
         (e) maintain forward link transmit power at the minimum value for a third selectable period; and
         (f) repeat operations (b) through (e) for a selectable number of cycles or until a desired reverse link is recovered, whichever occurs first;

when determining that the reverse link recovery mode of operation has succeeded by the reverse link quality meeting a reverse link recovered criteria, exit the reverse link recovery mode of operation; and when determining that the reverse link recovery mode of operation has failed, direct the base station to cease forward link transmissions to the cellular mobile station.

23. The cellular network infrastructure of claim 22, wherein at least one of the reverse link lost criteria and the reverse link recovered criteria are selectable.

24. The cellular network infrastructure of claim 22, wherein the at least one element of the cellular network infrastructure comprises:

the base station;

a base station controller; or a combination of the base station and the base station controller.

* * * * *

UNITED STATES PATENT AND TRADEMARK OFFICE
CERTIFICATE OF CORRECTION

| | |
|---|---|
| PATENT NO. | : 7,430,431 B2 |
| APPLICATION NO. | : 10/881281 |
| DATED | : September 30, 2008 |
| INVENTOR(S) | : Mark Harris and Dimitrios Prodanos |

It is certified that error appears in the above-identified patent and that said Letters Patent is hereby corrected as shown below:

Title page, Item 60: replace "Provisional application No. 60/526,535" with --Provisional application No. 60/525,535--.

Title page, Item 60: replace "filed on Dec. 3, 2003" with --filed on Nov. 26, 2003--.

Column 1, lines 8-9: replace "This application claims priority to U.S. Provisional Patent application Ser. No. 60/526,535" with --This application claims priority to U.S. Provisional Patent application Ser. No. 60/525,535--.

Column 1, line 9: replace "filed Dec. 3, 2003" with --filed Nov. 26, 2003--.

Column 12, line 64, in Claim 8: replace "w herein" with --wherein--.

Column 13, line 62, in Claim 18: replace "int he" with --in the--.

Column 14, line 37, in Claim 21: replace "Ec/Jo" with --Ec/Io--.

Signed and Sealed this

Twenty-fourth Day of November, 2009

David J. Kappos
*Director of the United States Patent and Trademark Office*